United States Patent [19]
Nelson et al.

[11] Patent Number: 5,999,948
[45] Date of Patent: Dec. 7, 1999

[54] DYNAMIC CONFIGURATION FORMS IN NETWORK MANAGEMENT SOFTWARE

[75] Inventors: William Joseph Nelson, Auburn; Paul B. Greizerstein, Hopkinton, both of Mass.

[73] Assignee: 3Com Corporation, Santa Clara, Calif.

[21] Appl. No.: 08/922,284

[22] Filed: Sep. 3, 1997

[51] Int. Cl.$^6$ .................................................. G06F 17/21
[52] U.S. Cl. ........................................................ 707/506
[58] Field of Search ........................... 395/706; 707/506; 345/433

[56] References Cited

U.S. PATENT DOCUMENTS 5,625,763  4/1997  Cirne ...................................... 345/433
5,625,823  4/1997  Debenedictis et al. ................. 395/706

OTHER PUBLICATIONS

Alpha Software Announces Beta Release of Concerto, Intelligent Form Software for the Internet, PR Newswire. (Apr. 25, 1996) pp. 1–4.

*Primary Examiner*—James P. Trammell
*Assistant Examiner*—John Leonard Young
*Attorney, Agent, or Firm*—McGlew & Tuttle, P.C.

[57] ABSTRACT

One or more form descriptions are expressed in the form description language (FDL) and are entered into an FDL file. The FDL file is then registered with a dynamic forms software module using a dynamic forms API. Upon registration, the file is parsed and software "specification" objects containing a data from the file or added to the internal catalogue of compiled form descriptions. When the application requests a form to be displayed, the dynamic form software finds the entry for the form in the catalogue, constructs the form using the information from the specification objects, and displays the information to the user. The form construction process includes the selection of widgets, the binding of each widget to a data source, the layout and alignment of all widgets, and the construction of rule objects that respond to the users interaction with the form and validate the users input.

24 Claims, 12 Drawing Sheets

FIG. 3A
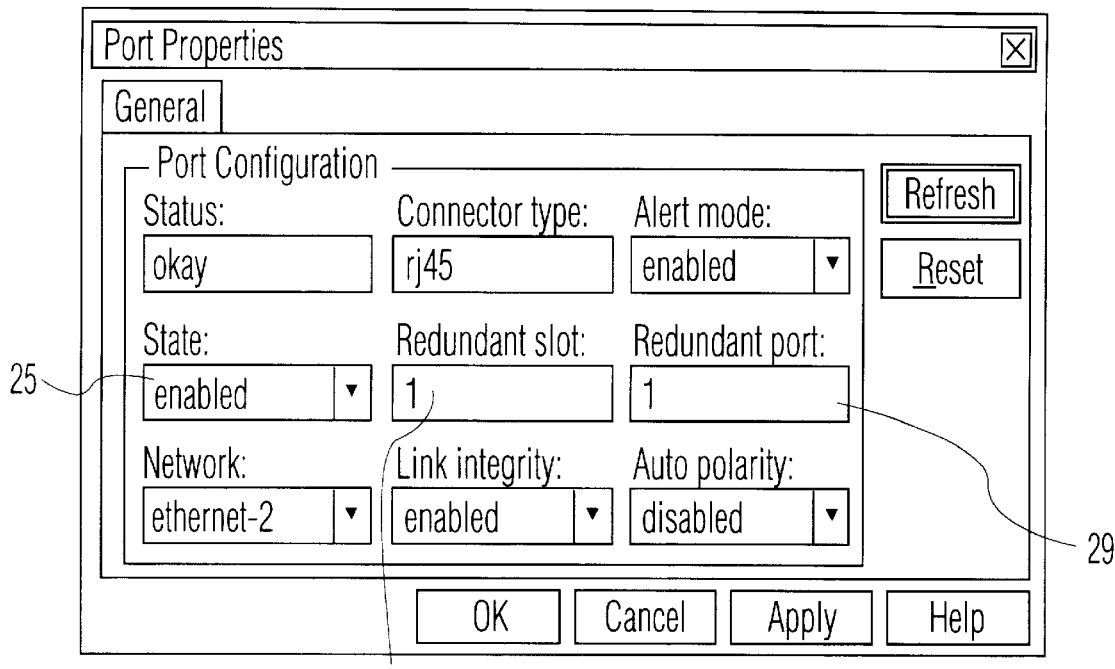
FIG. 3B
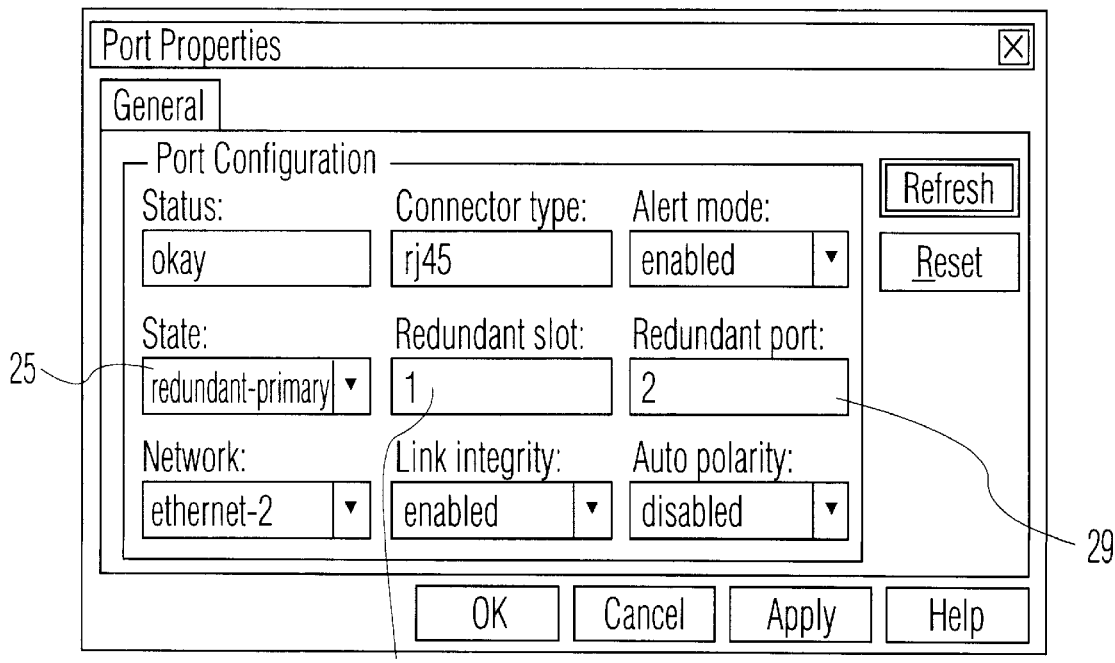
FIG. 4

| Data type | Access | Widget Type | Example (Windows) |
|---|---|---|---|
| Any type | Read-only | Static Text or read-only Edit Box | Module description: 600M-RCTL Fault-Tolerant Controller Module |
| Text | Read-write | Edit Box with length validation | Contact: Network Administrator |
| Integer with range of continuous values, increment by 1 desired | Read-write | Spin Control | Spin control: 97 |
| Integer with range of continuous values, increment by arbitrary value desired | Read-write | Slider Control | Polling interval: 10  45 seconds  60 |
| Integer with one value | Write-only | Push Button | Reset Mode |
| Boolean or On/Off | Read-write | Checkbox | ☐ Disabled Text |

FIG. 5A

| Data type | Access | Widget Type | Example (Windows) |
|---|---|---|---|
| Group of mutually exclusive On/Off data items | Read-write | Radio button group | ⦿ Choice1<br>○ Choice2 |
| Integer with an enumeration string to represent each legal value, or non-continuous values | Read-write | Drop-list Combo Box. | State:<br>[enabled ▼] |
| Text, list of choices or multiple values | Read-write | List box | Unassigned:<br>selection1<br>selection2<br>selection3 |
| Text, list of choices or new value defined by user | Read-write | Drop-down Combo Box | [          ▼] |
| Specialized type (IP address, MAC Address) | Read-write | Edit Box with specialized validation | IP address:<br>151.104.40.82 |

FIG. 5B

*Dynamic Forms Design*

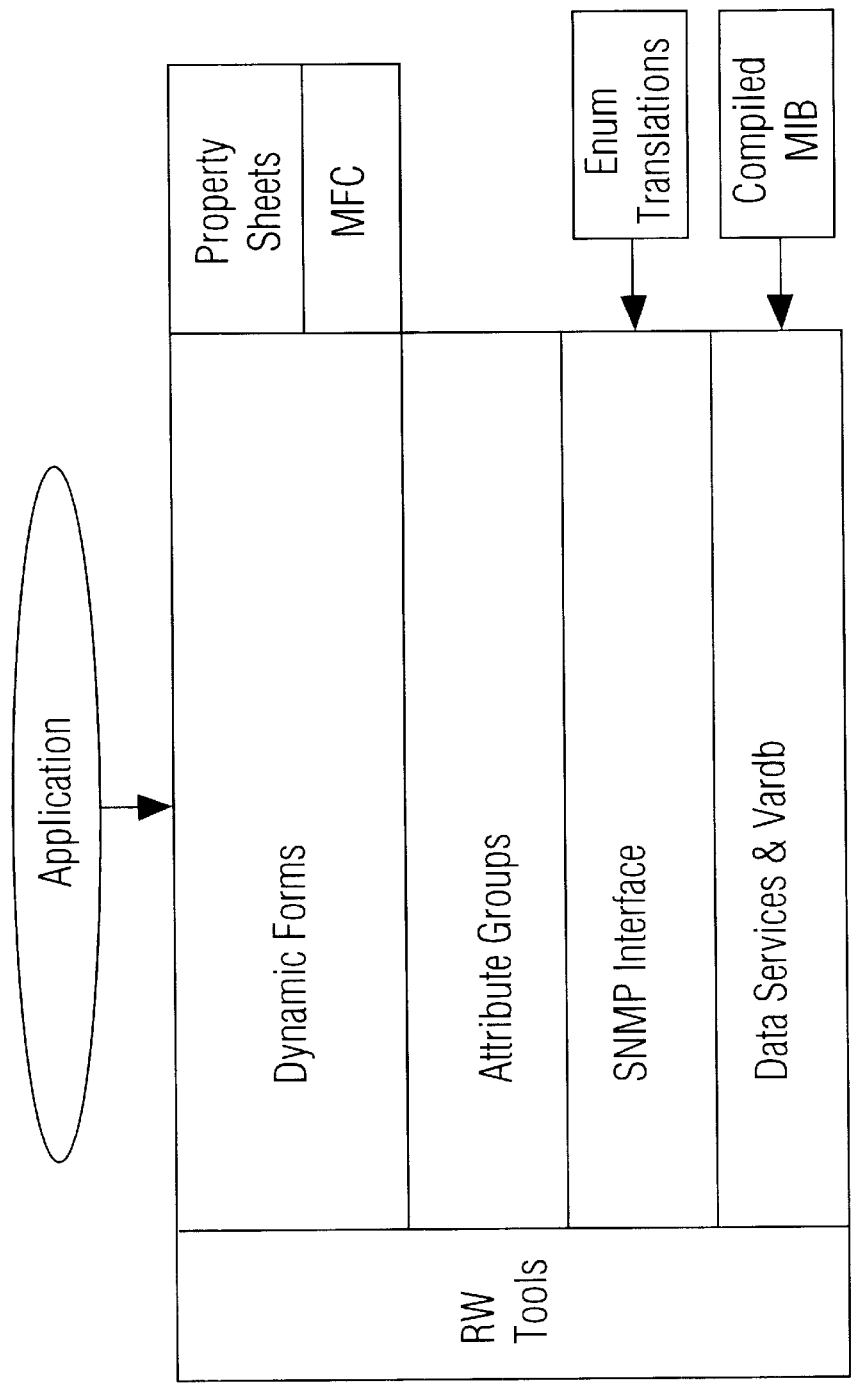

DYNAMIC CONFIGURATION FORMS IN NETWORK MANAGEMENT SOFTWARE

FIELD OF THE INVENTION

The present invention relates in general to the secondary windows that pop-up in management software and contain data regarding the operating parameters of a computer devices such as, Network Interface Cards (NIC's), hubs, stackables, etc. The present invention more specifically relates to an arrangement which centralizes the creating and operating of configuration forms in secondary windows.

BACKGROUND OF THE INVENTION

Many software programs or applications have the ability for the operator of the application to change the configuration of the application, the computer, the network upon which the application is running, or for the devices which the application is controlling. One way for an application to allow an operator to change a configuration, is for the application to present a secondary window to the operator displaying the data with which the present configuration is based, and giving the operator the ability to adjust this data. A secondary window which contains configuration data, and components for adjusting the configuration data, is known as a configuration form.

Network management software controls many different devices in a computer network and therefore has a large amount of data which can be configured by an operator. Each device management application within network management software provides many different configuration forms, often graphical in nature, and also referred to as dialogues and/or property sheets. These configuration forms enable users to configure the network devices from a remote location. Each configuration form displays the current value of one or more device attributes or operating parameters. The user interacts with the form to change the value of the attributes, and usually clicks a button to apply the changes to the device. The network management software then transfers the new values of the attributes to the device.

Although tools vary from platform to platform, the traditional method for developing device configuration forms includes the following steps.

The developer first researches the new device to determine the requirements for the configuration forms. This involves reviewing the Management Information Base (MIB) that the device supports and recommending changes or additions.

The developer then decides which data items (usually device MIB variables) are meaningful and useful to a user. Next, the developer determines how many configuration forms are needed and which data items should be displayed together on a single form.

For each data item the developer must decide what kind of widget or component will be used to display the data item. This decision is usually based on the properties of a data item, but often varies greatly from developer to developer. There may also be other widgets required for control (e.g. buttons) or to display/obtain data that comes from the user, not the device.

The developer then uses a tool to select the desired widgets and arrange them on the form. Although most tools provide aides to facilitate the alignment of widgets, the developer is responsible for placing each widget and associated label on the form, and aligning the widgets and labels with those in the surrounding area. The developer must create a visually appealing and intuitive layout while complying with the appropriate style guides. Creating a form with proper spacing and alignment is tedious and must be revisited each time the form changes.

Next the developer usually generates some amount of source code for the form using the tools. The amount and quality of the code varies from tool to tool, but the form almost always requires a significant amount of additional coding.

The developer must then complete the coding of the form, including retrieving the values of all data items from the device, handling user-generated events, validating the users input, and applying the users changes to the device.

The form is then integrated into the application tested for both proper operation and appearance.

Finally, the tested application is released, purchased by a customer, and installed on the customer's machine. Any change in an application will require the releasing of an updated version which is a substantial undertaking and requires significant documentation. This traditional method for providing device configuration support is problematic in many ways.

As software applications control more and more devices, and provide more functions and abilities, the number of configuration forms increases dramatically. Each improvement in an application usually adds additional configuration forms, with the result that a large number of configuration forms are developed over a number of years by different people. The result is that even within a single application, forms vary considerably in appearance, layout, alignment and widget selection. Moreover, many of these forms do not comply with the user interface style guide for the platform, and therefore fall short of a customer's expectations.

Consistency between windows UNIX and the command-line interface provided by the software embedded within a network device is virtually non-existent today. Application operators are forced to learn completely different styles to configure their application, computer or network. With Web-based configuration management, the consistency problem could potentially get worse.

Every configuration form is currently individually constructed, including both the graphical design and layout of the widgets within the form, and the code that controls the form and interacts with the device. A large amount of duplicate effort is required to develop and test these forms for all platforms (Windows, UNIX, Web, Embedded). Also, the amount of code that must be compiled and linked with each build grows with each new form, slowing down development time significantly.

Compared to other functionality provided by network management tools, configuration forms are not difficult to build. However, there are such a large number of configuration forms, that even a little wasted effort per form is expensive. Many network management applications have over 1,000 configuration forms.

The state of the art in graphical user interface (GUI) design changes rapidly. Windows 95 defined a new standard for the GUI on a Windows platform along with numerous new types of controls (widgets). Windows 97 along with advances in Web-base technologies will actually cause another major GUI paradigm shift in the near future.

Configuration forms developed in the conventional manner are compiled into executable software modules that must be then integrated, tested and installed with the entire application. New configuration forms can then only be released when a new version of the application is released.

SUMMARY AND OBJECTS OF THE INVENTION

It is an object of the present invention to provide configuration forms which are much easier to create by avoiding much of the redundant programming required for each configuration form. It is another object of the invention to have the format or appearance of each configuration form to be substantially consistent. Another object of the present invention is to allow additional and updated versions of the configuration forms to be released, without needing to release an updated version of the entire application. Still another object of the invention is to allow a new style of appearance, and/or the incorporation of new types of widgets, into all the forms without having to individually change all the forms.

The present invention accomplishes the objects by creating a form description language (FDL) for describing basic elements of a configuration file. The description of a configuration form in FDL, is called an FDL file. In its simplest configuration, an FDL file includes a description of the data which is presented and is modifiable by the form. In a preferred embodiment, the FDL file can also contain a basic layout type for the data.

A dynamic form software engine is created as being part of the application. When the application receives a request to display a particular configuration form, the application requests that the dynamic form software engine, or form engine, display the particular form. The form engine retrieves the FDL file for the corresponding configuration form. The form engine reads the respective FDL file, and parses the data described by the respective FDL file. The form engine then creates the secondary window in the application with a layout in accordance with the layout type of the respective FDL file, and then displays the data of the respective FDL file in the secondary window in accordance with the layout type.

Variations in the appearance of a configuration form, such as size, spacing and type of components is determined by a policy set in the forms engine. As an example, certain types of data will always have a certain type of widget presenting and modifying the data. The size of the window, size of the widgets, and spacing is restricted to one, or only specific values.

When new configuration forms are needed, or old configuration forms needed to be revised, only new FDL files need to be released and added to existing applications. A re-release of the entire software is not required. Also when it is desired to change the style of a configuration form, the policy of the form engine only needs to be changed, and not each individual form or even each FDL file.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 3a and 3b are a view of a dynamic form window where data has been modified according to user input and event action clauses within the form;

FIG. 4 is a view of a widget;

FIG. 5 is a description of several different types of widgets;

FIG. 9 shows the architectural components of the dynamic Forms.

DETAILED DESCRIPTION OF THE PREFERRED EMBODIMENTS

Figure 1:
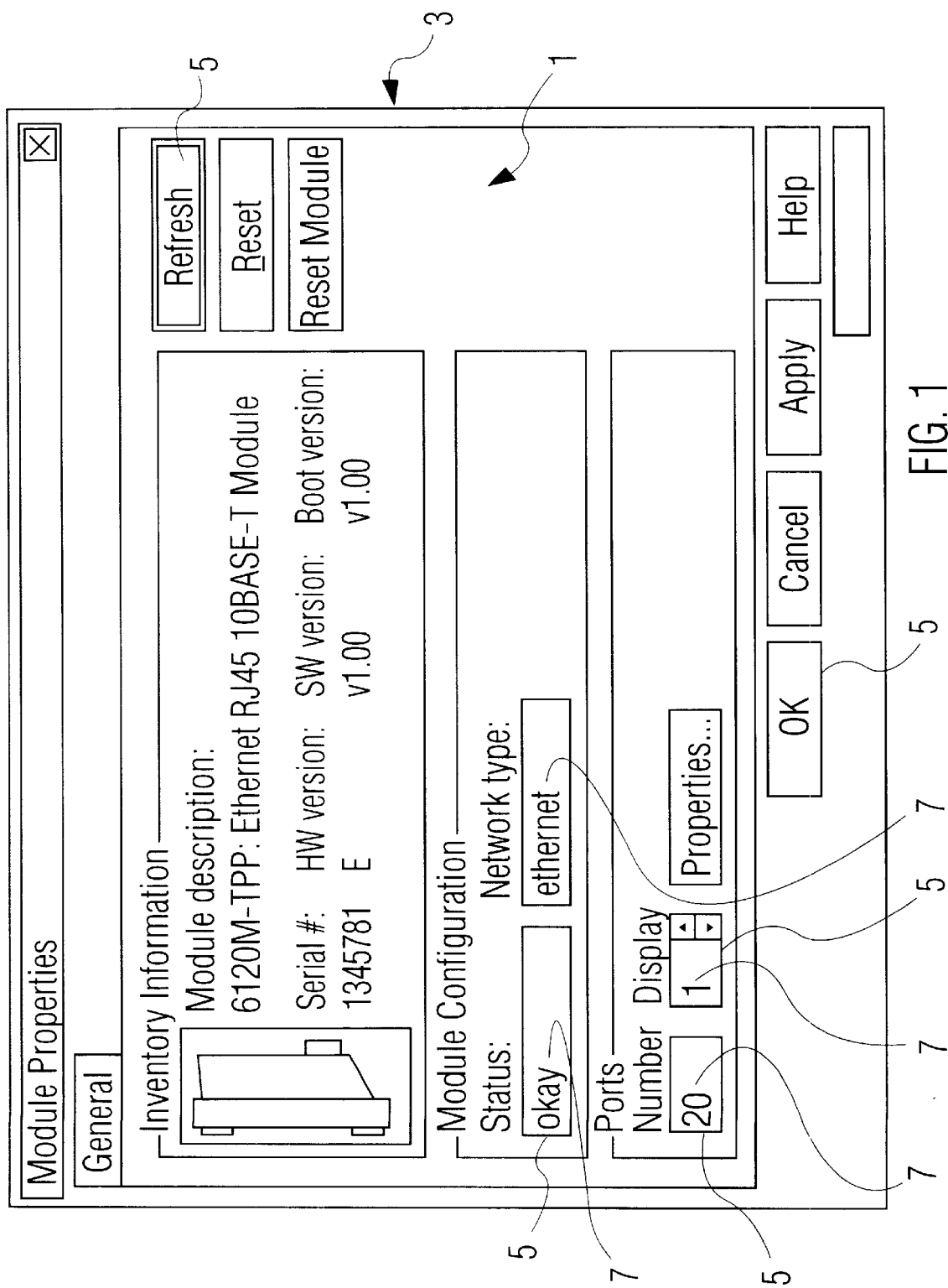
FIG. 1 is a view of a dynamic form secondary window.

Referring to the drawings, and in particular to FIG. 1, an example of a dynamic configuration form 1 is shown in a secondary window 3. Inside, or presented by the dynamic form 1, are a plurality of display components or widgets 5. The widgets 5 display data 7, and this data can be changed by the operator of the application, usually through the widget.

Figure 2:
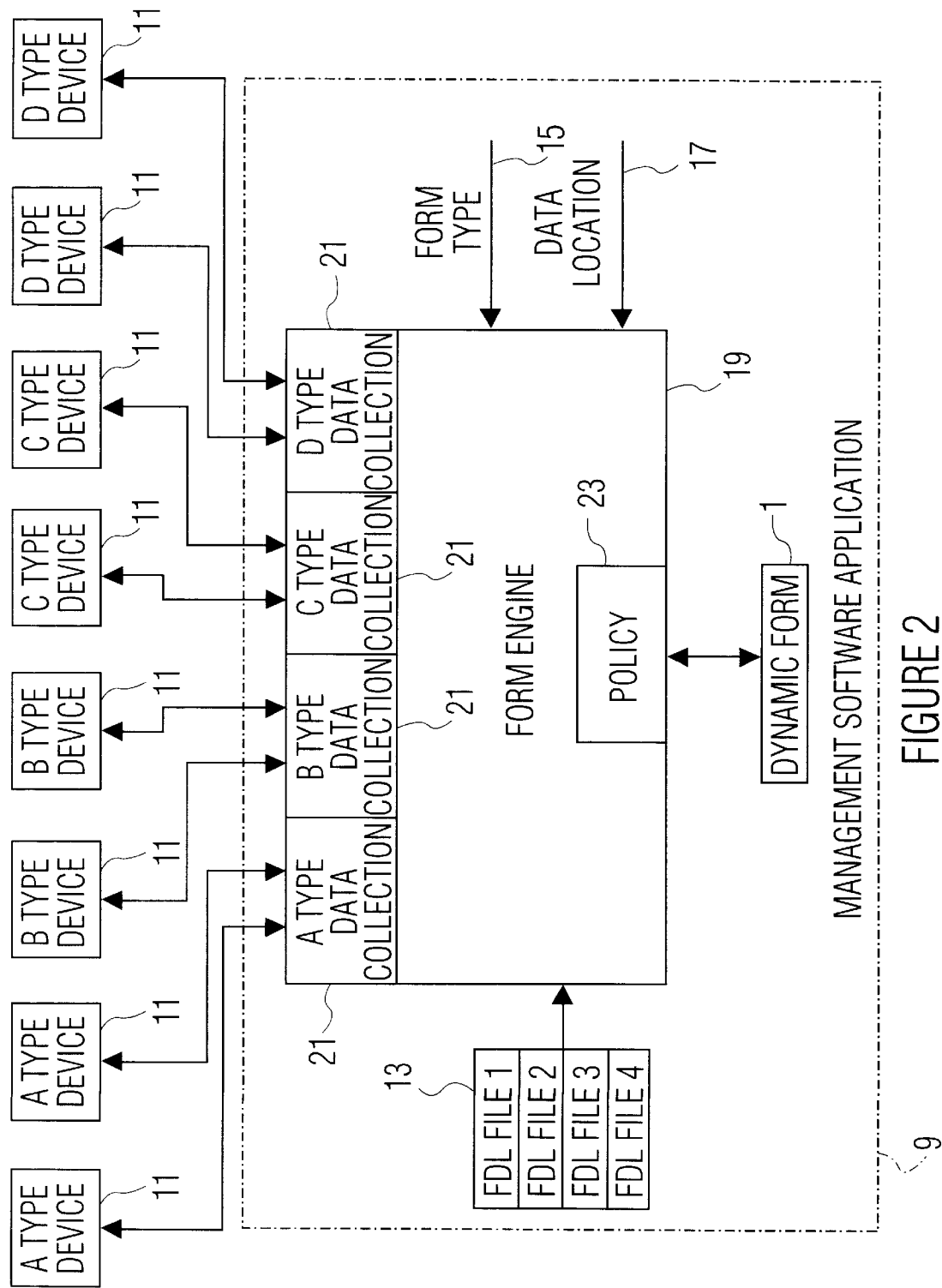
FIG. 2 is a flow diagram of the present invention.
Figure 6A:
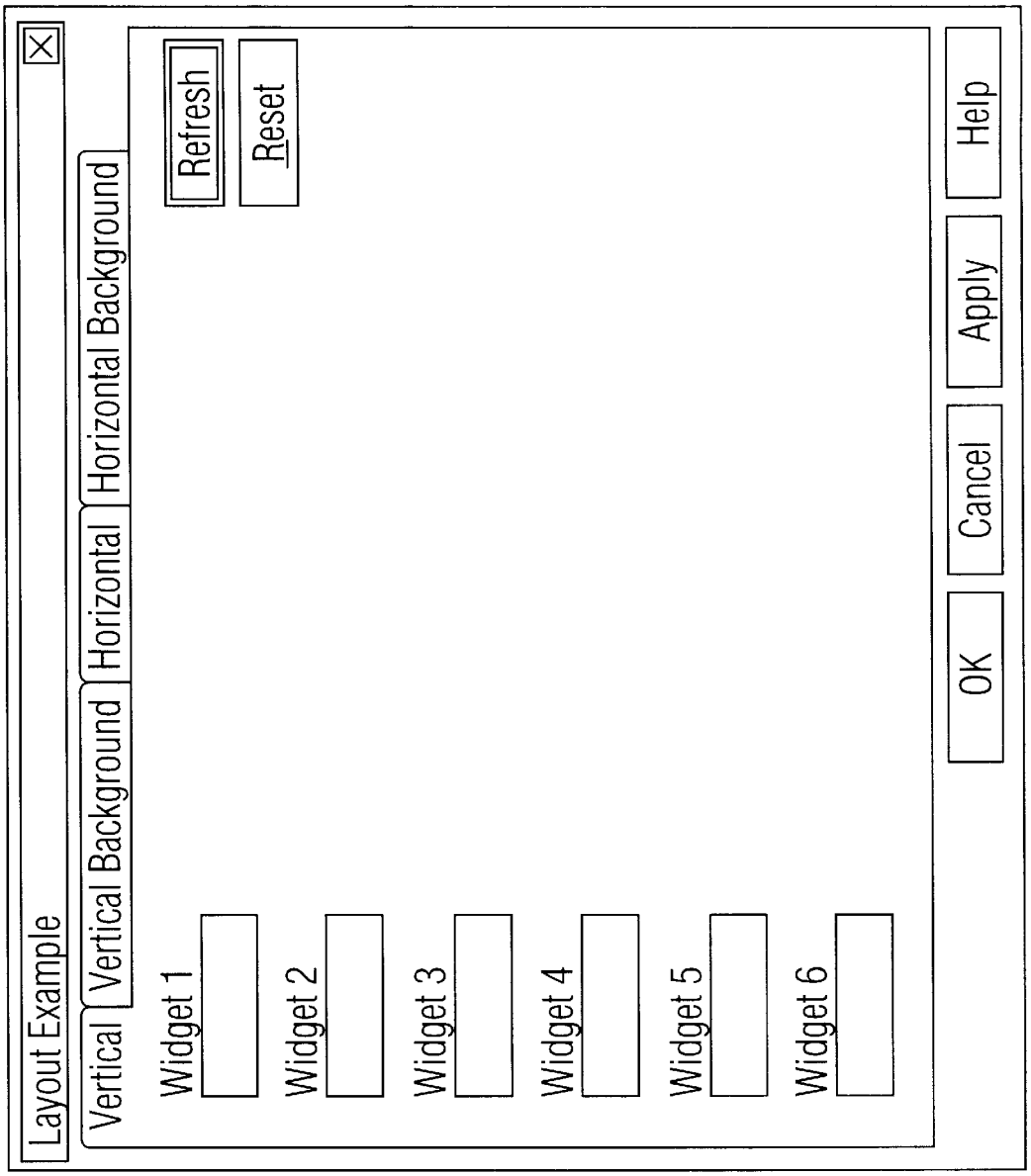
FIGS. 6A–D are a description of several different layout flow examples.
Figure 6B:
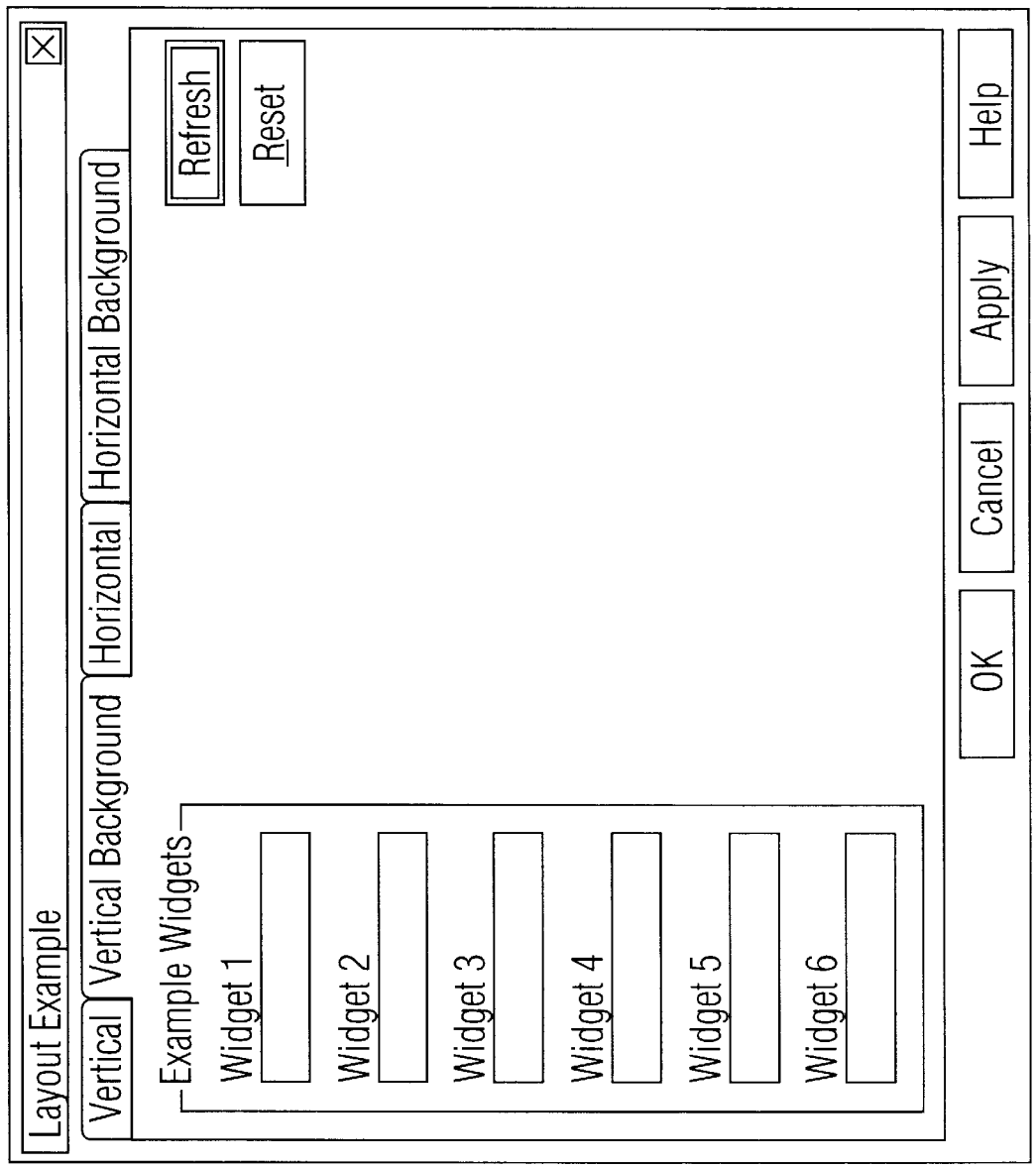
Figure 6C:
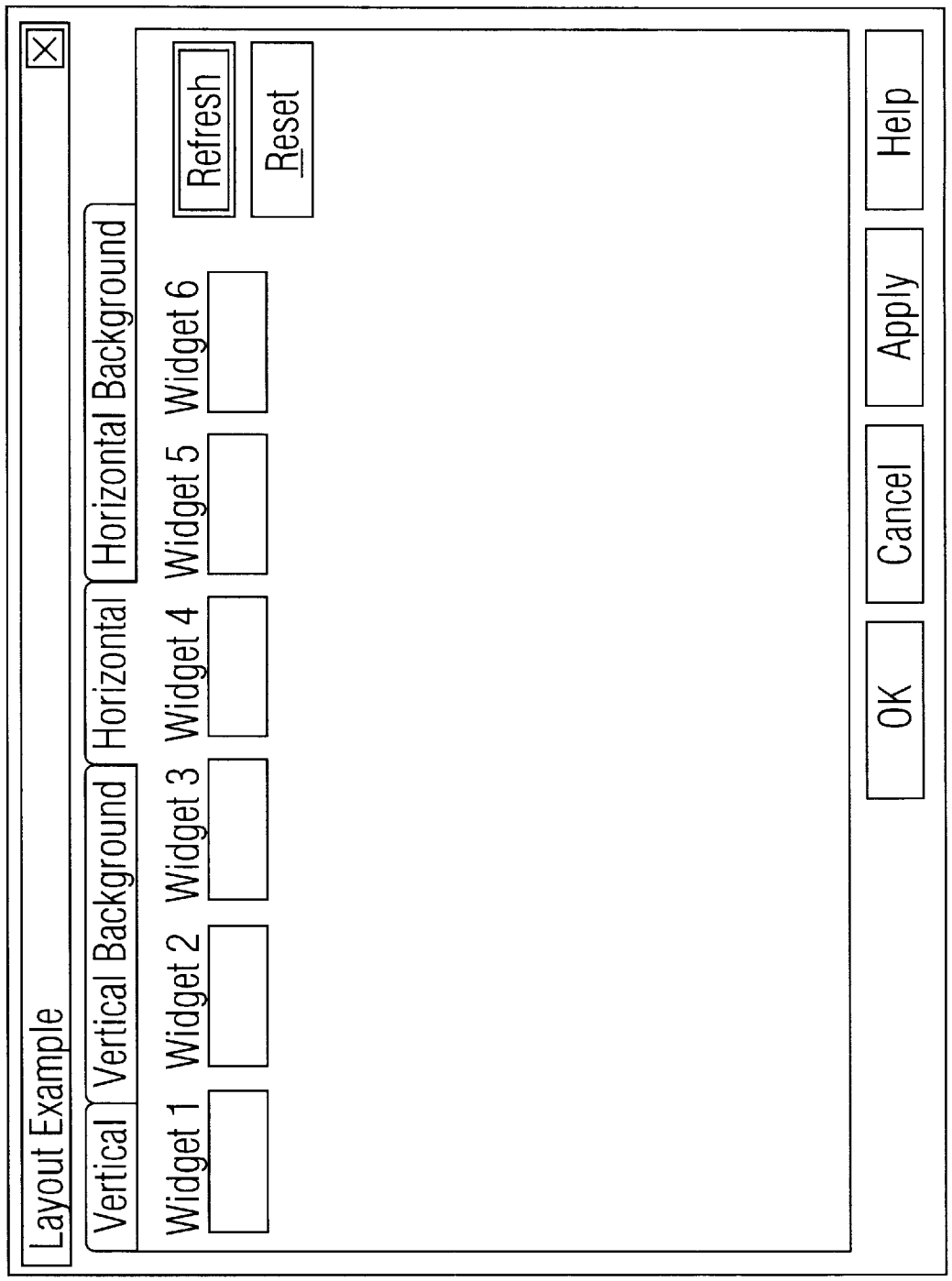
Figure 6D:
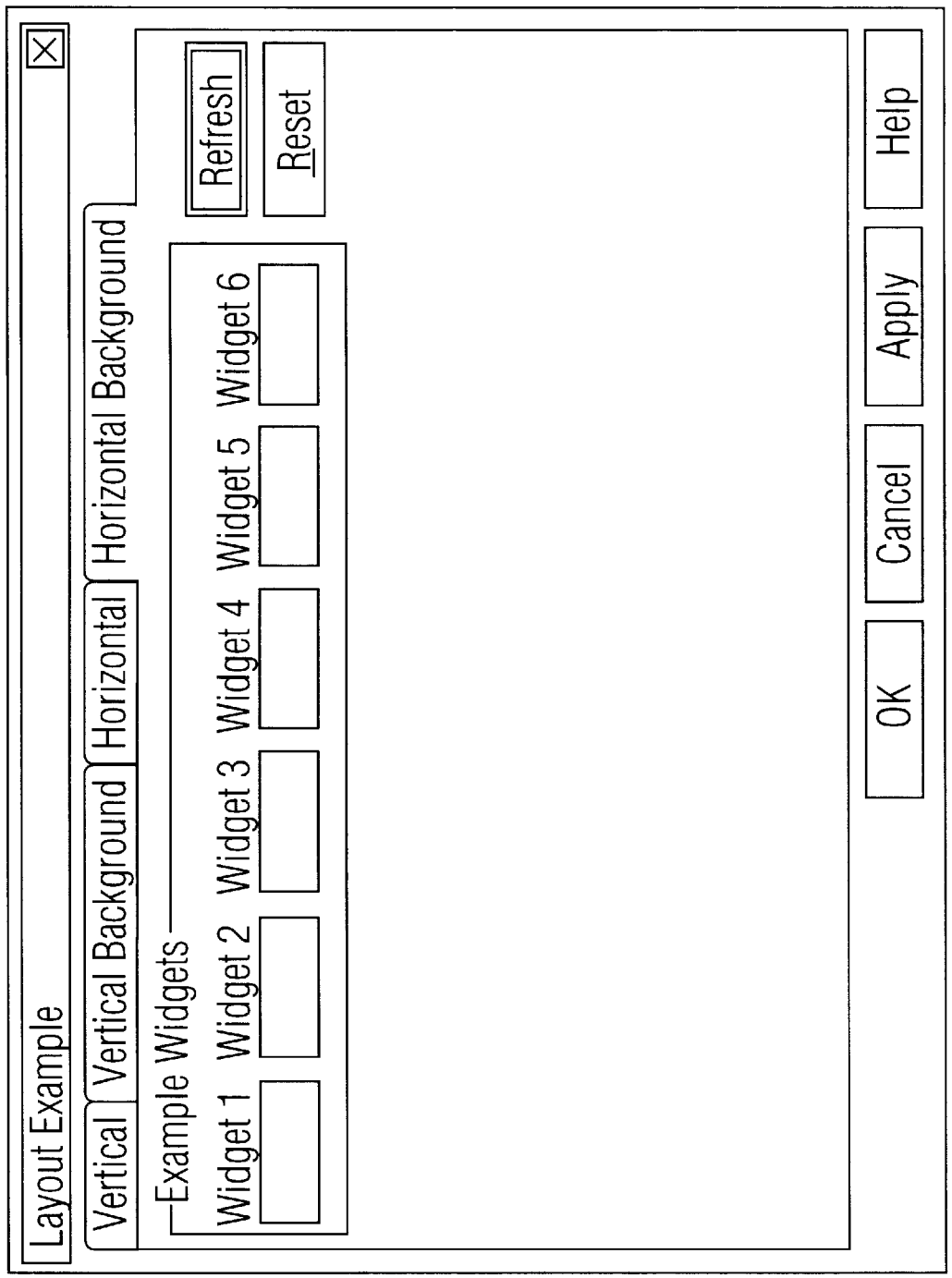

In the preferred embodiment, as shown in FIG. 2, the software application is a network management application 9 which controls a plurality of different network devices 11. Inside the application 9 are a plurality of FDL files 13. These contain a description of the different types of data 7 in the form 1, and more specifically includes specifications for obtaining the data 7, i.e. descriptions of MIB variables. The data 7 itself is contained in a particular device on the network and the Data Collection is created from the FDL file 13. The FDL files 13 while part of the application 9, are separately insertable and removable into and out of the application 9. When the application 9 desires to present a dynamic form 1, it sends a form type request 15 and a data location request 17 to the form engine 19. The form engine then reads the FDL file 13 corresponding to the form type 15. The form engine 19 then creates the different types of Data Collections 21 for the appropriate data described in the corresponding FDL file 13.

The application can retrieve data from many different types of devices. These devices can have different conventions for storing the data and can be connected to the application according to different conventions. The form engine 19 has a separate data collection portion 21 for each type of device and connection convention. The data location request 17 indicates the type and convention of the data which is to be retrieved, and also identifies the individual device. In this way each form does not need to have its own code for retrieving and modifying data in each device. Also, the same FDL file 13 and therefore the same type of configuration form 1 can be used for each device, especially devices of the same type, by just specifying a different data location. An example of one form being used for different devices is if an application manages a plurality of modules, where each module has a plurality of ports. A configuration form is often requested for showing the status of the individual ports on a specific module. In the present invention, one FDL file 13 can be used to display the port status of different modules, just by changing the data location request 17.

The form engine 19 then collects the corresponding data, and reads any layout information from the corresponding FDL file. The policy portion 23 then arranges the data according to any layout information in the FDL file 13, and adds additional appearance and style features to create the final appearance of the dynamic form 1. The dynamic form 1 is then presented in the secondary window 3.

In creating the arrangement of the present invention, one or more FDL files 13 are created by a developer and saved. The application registers the file with the form engine 19 at run-time using a dynamic form Application Programmer's Interface (API) The API is a specific interface for the form engine which calls the dynamic forms. Upon registration, the file is parsed in software "specification" objects containing the data from the file and are added to the internal catalogue of compiled form descriptions.

The form engine 19, or FDL files 13 can contain rule descriptions which also control values of individual items of the data. Such rule descriptions can include limiting the maximum and minimum values of a data item, and also adjusting the value of a second item, based on a new value of a first item. FIGS. 3*a* and 3*b* show a dynamic form after the value of the "state" data item or widget 25 has been changed from "enabled" to "redundant-primary". As can be seen in FIG. 3*b*, this change has also changed the "redundant slot:" widget or data item 27 and the "redundant port:" widget or data item 29 to an active or enabled state. The "redundant port:" data item has had its value changed from one to two. This is due to an Action and Event clause in the grammar of the FDL file.

When the application requests that a form be displayed, the form engine 19 finds the entry for the form in the catalogue, constructs the form using the information from the specification objects, and displays it to the user. The form construction process includes the selection of widgets, the binding of each widget to a data source, the layout and alignment of all widgets, and the construction of rule objects that respond to the users interaction with the form and validate the users input.

Figure 7:
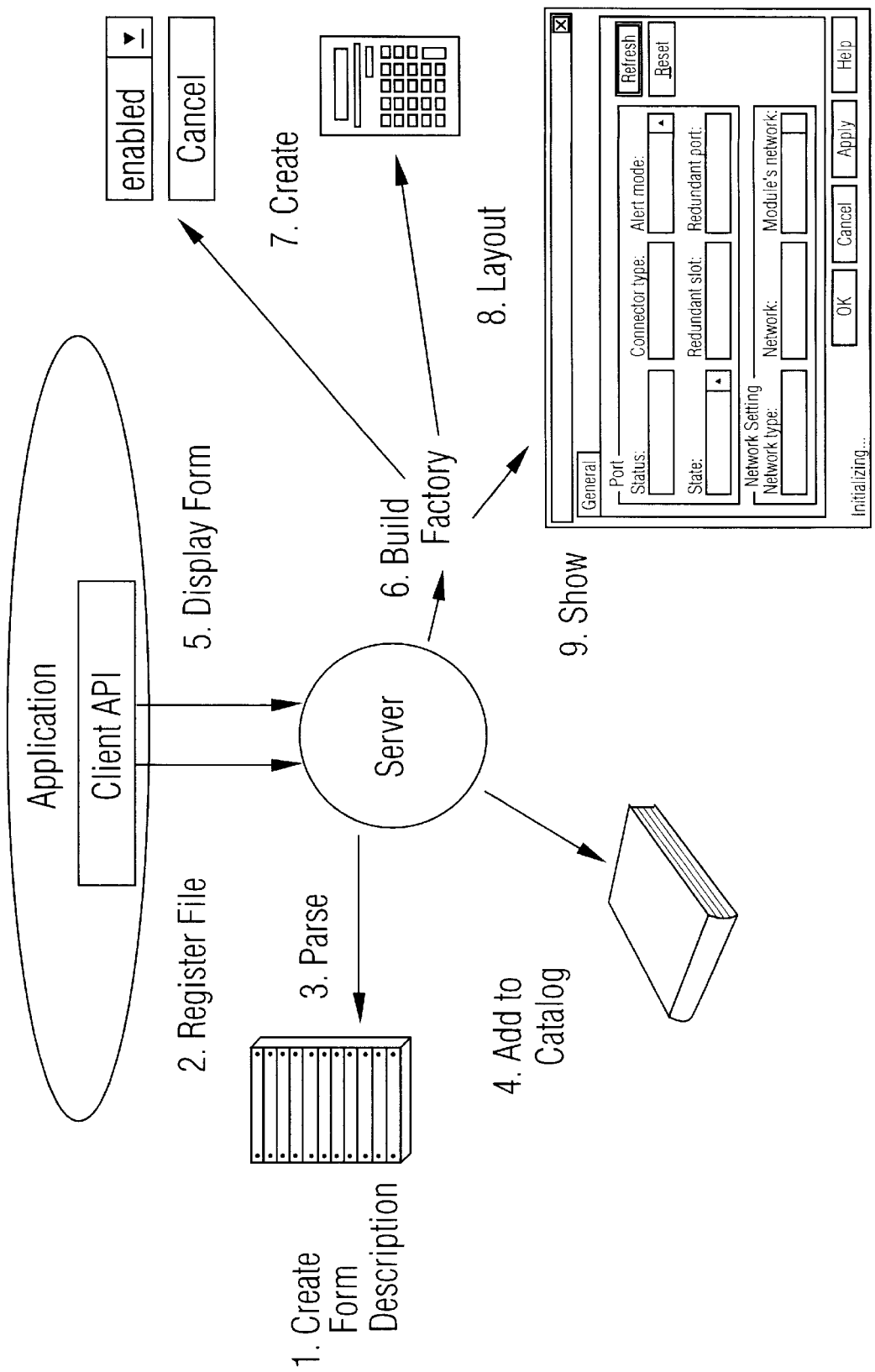
FIG. 7 is a flow diagram of the steps for creating a Dynamic Form.

The steps for creating a dynamic form are shown in FIG. 7 and described below.

1. Create Form Description

The user identifies the data to be presented in the form and the logical groupings. The user then writes the FDL file. The data for each page is placed in a Data Collection. Then the form section is created grouping and identifying the various widgets. Any relationships are added using Constraints and Actions & Events.

2. Register File

The application using dynamic forms registers the FDL file with the Dynamic Forms Engine using the Client API.

3. Parse

The Dynamic Forms engine parses the grammar in the FDL file and generates the necessary Factory objects and Form specification classes.

4. Add to Catalogue

The parsed information is added to a list of catalogued forms.

5. Display Form

A request to display the form is made.

6. Build

The Dynamic Forms engine constructs the form using the factories and specifications in the catalogue.

7. Create

The factories create the elements of the form.

8. Layout

The factories layout all the elements in the form based on the Dynamic Forms Engine's layout policy.

9. Show

The completed form is displayed on the screen.

Figure 8:
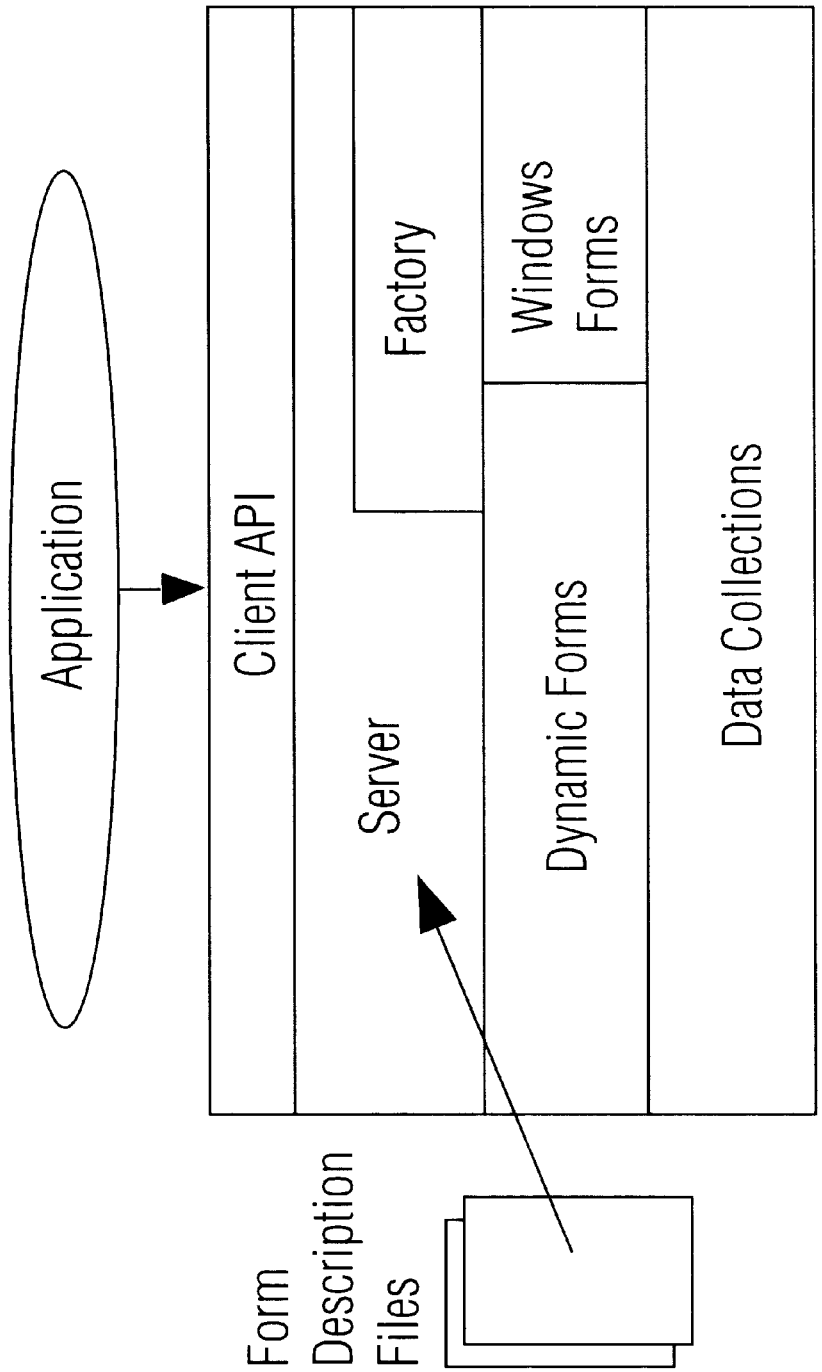
FIG. 8 shows the design of the Dynamic Forms.

In Dynamic Form Design, as shown in FIG. 8, the Client API is used to access the Dynamic Forms Engine. The application using Dynamic Forms interacts using the defined member functions that compose this interface. The application does not interact with any of the underlying implementation and the Client is the user of the Dynamic Forms. The Server acts upon the requests of the client, and contains the FDL files and the mechanisms for creating the forms. The Factory is contained by the server that generates the elements of the form by processing the data in the FDL file. The Dynamic Form portion represents the widget components that use the Data Collection and define the behavior of the forms. The Windows Forms are a specific type of Dynamic Forms that run on a Windows platform. The Data Collections are the objects used to contain and process the data used by the Dynamic Form. The actual source of the data is separated from the individual widgets in the Dynamic Form. All accesses to the data are handled by the interface to the Data Collection.

The components of the Dynamic Forms architecture are described in FIG. 9 and preferably include RW Tools which is software package containing C++software classes for Lists, Strings, and other generic tools that are used within the present invention code. The Dynamic Forms component is the code for the Dynamic Forms engine. The Property Sheets are a style of dialog window commonly used to read/write properties of an item. Property sheets have multiple tabbed pages with column buttons on the side for each page and a set of standard buttons across the bottom. MFC (Microsoft Foundation Classes) is a set of software classes for use when developing Microsoft Windows applications. These classes are used when creating the Windows Forms. The Attribute Groups are a code layer which groups individual SNMP MIB variables together into groups. These groups are then used when setting and getting SNMP data. The SNMP Interface is another code layer which acts as the interface into the SNMP code. The Data Services & Vardb is a code layer which performs the SNMP operations. This layer also is used to access information from the compiled MIB. The Enum Translations are Data that is used by the SNMP interface to override the enumeration values derived from the MIB. These are used to make enumeration strings more user friendly or to limit values to a smaller set. The Compiled MIB is all the MIB information for the application and is compiled using a MIB compiler. This information is then used by Vardb to manage SNMP data.

The design of the present invention uses a subject/view architecture, where the subject is a description of the data, and the view is the dynamic form. The primary advantage of this architecture is that the data description has no, and requires no, knowledge of the dynamic form. In effect, an application can use the dynamic forms tool to create a data collection without creating a form. This loose coupling between the form and the data makes it easy to add new types of widgets and forms without impacting the design of the data collection. Also, this loose coupling allows addition of new types of Data Collection without affecting the form. New types of data bases storing data in a different form, or new protocols for conveying the data, can be used by providing a Data Collection for the new data base or protocol without affecting the form.

While there are only a few different types of data items (integer, string, etc.), there are many different sources of data. For example, a form may display data that is retrieved from a network device via SNMP (Simple Network Management Protocol), from a web server via HTTP, or from a database which may either be local or distributed across the network. The form does not care where the data comes from, as long as the form engine has the ability to retrieve, validate and store the data. The design of the dynamic form tool isolates the form's interaction with the data from the actual data source through the use of a data location. A data location identifies the type of data source (e.g. SNMP) as well as the information needed to locate a specific instance of a data item from the data source (e.g. IP address, community, and suffix values for an SNMP data location). When the dynamic forms tool creates a data collection, it uses the location information to create a specific kind of data group and data item within the data collection. The form interacts with the data collection and data item interfaces without knowing or caring where the data values come from. This separation makes it easy to add new sources of data in the future.

The process of dynamically creating both a dynamic form and a Data Collection at run-time based on a form description is complex. There are many objects that must be created and associated with each other. The design of dynamic forms isolates the object creation functions within "factory" objects using the abstract factory pattern description as described on page 87 in the reference, "Design Patterns, Elements of Reusable Object Oriented Software" by Erich Gamma, Richard Helm, Ralph Johnson, and John Vlissides, and published by Addison-Wesley 1995, ISBN 0-201-63361-2.

These factory objects do nothing more than create instances of specific types of objects, such as a Windows Combo Box widget. The factory objects are controlled by "factory manager" or builder objects. The objects are responsible for interpreting the data from the form description, and invoking the factory objects to create the appropriate objects. The basic idea behind a form description is that all forms are basically alike at a very low level. They retrieve some data, present the data to the user, and allow the user to change the data. There are only a few different types of data and a limited number of ways each piece of data can be presented at the time. These differences can be abstracted and captured in a text file such that a dynamic forms content and behavior is completely determined by the form description.

The syntax and semantics of a form description is defined by the form description language (FDL).

The syntax of the FDL is defined by a context-feed LALR (Look Ahead Left to Right) grammar. There are three significant benefits to having a complete, self-contained form description.

First it becomes very easy to upgrade the application to include new forms to support new hardware devices. New FDL files are copied into the applications run-time directory, and the application can instantly use the new files. The application locates and parses the form description each time the user requests a form. Since the application processes form descriptions "on demand" instead of when the application starts up, configuration forms for new modules can be added while the application is running. The FDL files can be made available with new hardware, or be available for downloading from a web site. In either case, an operator or user of the application can have configuration support for newly purchased hardware, immediately with the new hardware, instead of waiting for the next release of the entire application software.

Secondly, developers can test a form and fix errors much more quickly then with the traditional method of form development. For example, if a widgets label is incorrectly spelled in the form description, the developer can edit the form description, save the file, and instantly retest the form, all without quitting the application and without recompiling any code.

Finally, the FDL file is platform-independent. Since it completely and generically describes the content and behavior of a form, it is possible to leverage this description to provide web-base configuration management that is consistent with that provided in native applications. In a preferred embodiment, each form description is translated into Java source code, this can then be compiled into Java class files. These class files can be stored within a network device and uploaded into a web browser when requested by the user. Thus a single form description can be used to provide consistent configuration management across all environments-Windows, UNIX, Web and Embedded.

The Dynamic Forms tool has the unique ability to automatically select a widget type based on the characteristics of the data item being displayed by the widget. Not only does this feature make it easier to write the widget's description in FDL, it also centralizes the widget selection algorithm. This makes it feasible to change the look of all forms with an application as new widgets become popular in the future. Of course, the developer always has the option to override this feature and specie the widget type to be used for any data item.

The following is an example of a widget that allows the user to enable or disable a port on a module. The SNMP MIB variable definition for the data item is shown below: Note that the MIB variable description is not part of the FDL, but is instead separately compiled into the portion of the Dynamic Forms tool, or Form Engine in FIG. 2, that knows how to build SNMP Data Groups.

The MIB variable definition . . .
    oc61nnMTPLPortAdminState OBJECT-TYPE
        SYNTAX INTEGER {
            enabled(1),
            disabled(2),
            redundant-primary(3),
            redundant-backup(4),
            remote-diagnostics(8)
        }
        ACCESS read-write
        STATUS mandatory
        DESCRIPTION
            "The desired state of this port. Setting this port to be redundant or for remote diagnostics with invalid settings of buddy slot and buddy port will return the genError error."
        ::={oc61nnMTPLPortEntry 3}

The definition of the data item, from the data collection description . . .
    DATAITEM oc61nnMTPLPortAdminState READONLY
        False TYPE INTEGER ENUMS True;

The definition of the widget, from the form description . . .
    WIDGET oc61nnMTPLPortAdminState LABEL "State:"
        WIDTH 18 TYPE AUTO;

The above DATAITEM clause indicates that the user is allowed to modify the data item and that the data item is an integer. The "ENUMS True" flag indicates that enumeration strings should be used rather than integer values. The WIDGET clause specifies a widget type of "AUTO". When the Dynamic Forms tool creates this widget, it will first find the DATAITEM with the same name as the widget. Next, it uses the data item's attributes to automatically determine the type of widget to create. Since this widget is an integer with enumeration strings and the user is allowed to change the value, Dynamic Forms will automatically create a Drop-List Combo Box widget. The drop list portion of the Combo Box is automatically populated with all of the enumeration choices and resized to display these choices without using scrollbars. The resulting widget is show in FIG. 4.

One example of the mapping possible by the Dynamic Forms Automatic Widget selection feature is shown in FIG. 5.

The present invention also determines the layout or appearance of the dynamic form. This is specified in the FDL file, and in the policy portion of the form engine. In the preferred embodiment, both the FDL file and the policy portion determine the layout of the dynamic form, with the FDL file determining either a horizontal or vertical flow of the widgets, and the form engine determining the position or spacing of the widgets.

Layout is the task of organizing and positioning widgets within a form. There are two aspects of a form's layout that need to be considered, namely the macro-layout and the micro-layout.

The macro-layout of a form gives the form its overall structure. Macro-layout includes the design of the form's workflow, the organization of the form, and the grouping of elements within the form. Information within the form must be grouped in a manner that is logical and useful to the user. A good macro-layout makes the form intuitive for a user and therefore easy to use. A form with a bad macro-layout looks like it was thrown together at random. Since an effective grouping requires a knowledge of the form's content and purpose, it is difficult to automate the macro-layout decisions.

Macro-layout has the following issues:

What tasks will the user perform most often? How can the contents of the form be arranged to make these tasks easier? How to group the widgets within a form? Should a group of widgets be explicitly labeled using a group box? Should the form be organized from top to bottom or from left to right? Should each group of widgets be organized from top to bottom or from left to right? Is the form too big? If so, what is the best way to split the content into multiple pages?

The micro-layout gives the form its consistency and compliance to style guides. Micro-layout includes the alignment, spacing, and sizing of widgets. A good micro-layout is invisible—the user never notices the layout, the form just naturally draws the user's eye to form's content. A bad micro-layout is very noticeable and distracts the user from the task at hand. Creating a good micro-layout by hand is tedious and time-consuming, but fortunately micro-layout issues can be automated.

Micro-layout has the following issues:

Where should this widget go? If it is put there, is this form too wide or too tall? Where should the label for this widget go? Are the gaps between widgets and their labels consistent? Are the widgets correctly aligned? How tall should this widget be? Is the edit box wide enough to fit 16 characters? Is the list box tall enough to hold all selections?

The Dynamic Forms layout mechanism allows the developer to describe the macro-layout of a form using the form description. Thus the developer has complete control over the layout aspects which require knowledge of the application domain or are important to the overall workflow and organization of the form. The micro-layout of the a Dynamic Form is completely automated. The micro-layout algorithm makes decisions based on the specified macro-layout parameters, the attributes of each widget, and standard built-in values. This unique approach to layout results in forms that are both easy to use and precisely consistent, not to mention easier to develop.

The following is an example of how a developer describes the macro-layout of a form. After identifying all of the widgets that a form contains, a developer decides how to logically group the widgets within the form. The form itself and each group of widgets can be thought of as a container. The form description enables the developer to specify the layout type and size of each container. The layout specification is very simple, but since groups may be nested and each group has its own layout, a large variety of aesthetically-pleasing layouts can be created.

Below is an excerpt from a form description that defines a group of widgets and specifies the macro-layout for the group:

```
GROUP "Port Configuration" VISIBLE True
    LAYOUT HFLOW SIZE LARGE UNIFORM False
{
    WIDGET ocPortStatus LABEL "Status:" WIDTH 20 TYPE AUTO;
    WIDGET ocPortConnector LABEL "Connector type:" WIDTH 16 TYPE AUTO;
    WIDGET ocPortAlertMode LABEL "Alert mode:" WIDTH 16 TYPE AUTO;
    WIDGET oc65nnMTXPortAdminState LABEL "State:" WIDTH 20 TYPE AUTO;
    WIDGET oc65nnMTXPortBuddySlot LABEL "Redundant slot:" WIDTH 16 TYPE AUTO;
    WIDGET oc65nnMTXPortBuddyPort LABEL "Redundant port:" WIDTH 16 TYPE AUTO;
}
```

The LAYOUT clause specifies the type of layout to be used for the group of widgets. The defined values are VFLOW for a Vertical Flow layout and HFLOW for a Horizontal Flow layout. Dynamic Forms uses this layout type along with the value of the group's VISIBLE flag to select one of the following four layout types, which are illustrated in FIGS. 6A–D.

Vertical Flow layout—components are arranged vertically from top to bottom, until the layout size exceeds the size specified in the SIZE clause. As each component is created, the layout algorithm determines if the new component will cause the desired size of the layout to be exceeded. If so, a new column of components is started, and the new component becomes the first member of the new column. The X coordinate of the new column is automatically determined based on the widest member of the previous column.

Vertical Flow Background layout—same as a Vertical Flow layout, except that a Group Box widget is drawn around the group. This type of layout is automatically selected when the form description identifies a group as "VISIBLE True" with a layout of VFLOW.

Horizontal Flow layout—components are arranged horizontally from left to right, until the layout size exceeds the size specified in the SIZE clause. As each component is created, the layout algorithm determines if the new component will cause the desired size of the layout to be exceeded. If so, a new row of components is started, and the new component becomes the first member of the new row. The Y coordinate of the new row is automatically determined based on the tallest member of the previous row.

Horizontal Flow Background layout—same as a Horizontal Flow layout, except that a Group Box widget is drawn around the group. This type of layout is automatically selected when the form description identifies a group as "VISIBLE True" with a layout of HFLOW.

The SIZE clause roughly defines the desired size of a container using one of the following values: MINIMAL, SMALL, MEDIUM, LARGE, XLARGE, or UNLIMITED. A developer can use SIZE UNLIMITED to guarantee that a layout will have a single row or column, otherwise one of the other values can be used to limit the size of a container in a single dimension.

The UNIFORM flag forces the components within the container to be uniformly sized in one dimension. For horizontal layouts, "UNIFORM True" will make all components the same height. For vertical layouts, "UNIFORM True" will make all components the same width. A common use for this flag is to make all visible groups within a form the same width, thereby causing the group box widgets that surround the groups be perfectly aligned with each other.

Before describing the micro-layout algorithm, we will first explain the units of measurement used by the algorithm.

Dynamic Forms performs layout using device-independent logical units referred to as Dialog Logical Units (DLUs). A DLU is a unit of horizontal or vertical distance within a form. A horizontal DLU is equal to one-fourth of the average character width for the current system font. A vertical DLU is equal to one-eighth of an average character height for the current system font. Since Dynamic Forms calculates the layout relative to the system font, the resulting form will be proportionally sized regardless of the system font and screen resolution.

Although DLUs are used internally by Dynamic Forms, most developers do not think in terms of DLUs. The form description enables a developer to specify the size of a widget in more natural units. The width of the widget is specified in characters, while the height of multi-line widgets (such as a table, list box, or multi-line edit box) is specified as a number of rows. The height of single-line widgets (buttons, edit box, etc.) is not specified by the developer, it is automatically set to a standard height of 14 DLUs. As shown in Table 1, Dynamic Forms automatically selects inter-widget gaps and margins based on the standards defined in the user interface guidelines.

TABLE 1

Dynamic Forms uses built-in standard values to determine the spacing between widgets.

| Standard Dimension | Value in DLUs |
| --- | --- |
| Margin | 7 |
| Vertical inter-widget gap | 4 |
| Horizontal inter-widget gap | 7 |
| Vertical gap between a label and a widget | 1 |
| default height of a single-line widget | 14 |
| default push-button width | 50 |

The present invention includes a three phase micro-layout algorithm.

The function of the first layout phase is to build a list that captures the containment relationships of the form's components. This list is constructed while the form is being built. As each component (group or widget) is created, it is added to its enclosing container's component list. Components are created and added in a recursive fashion, such that the component lists of the innermost containers are completed first, while the list for the form itself, always the outermost container, is completed last.

The second phase of layout begins with the form itself. The form initiates a recursive walk of the component lists by instructing the first component to position itself at an origin point. If this component is itself a container, the container instructs its first component to begin its layout at this origin. This recursion continues until a widget is reached, which simply positions itself at the origin. After a component is initially positioned, it is added to the layout of the enclosing container using the macro-layout parameters of the container along with the width and height of the component. As each component is added to the layout, the size of the layout is computed along with the starting origin of the next component. The layout algorithm automatically adds standard size gaps between widgets at this time.

If the addition of the component would make the container too wide or too tall, the component is moved to a different origin and the component is told to compute its layout again.

During the second phase, each container is given an origin point by its enclosing container. As each component is added, the position of the component is determined relative to the container's origin point. The exception to this are containers with background layout types. These containers have two origin points, a background origin at (X,Y) and a component origin at (X+7,Y+7). Components are positioned relative to the component origin, leaving space for the Group Box widget that will be positioned during the third layout phase.

The entire layout of the form is finalized during the third phase. Each container is told to finalize its layout, again in a recursive manner. During this process, a component may be reshaped if the container's UNIFORM flag is set to True. This does not affect the overall layout since the container's size will not be changed. If a container has a background layout type, the Group Box widget is positioned at the background origin point and sized to surround all of the components within the container.

Note that with the exception of the Group Box widget, the size of a widget is never changed by the layout process. A widget's size is completely determined by the form description and built-in defaults.

The data used in a form is maintained by the DataCollection. The DataCollection maintains the source of the data internally and provides a common external interface for manipulating many forms of data. The data in a collection could come from different databases, memory, or over the network using different protocols like SNMP. Users of a DataCollection can Set, Get, Apply, Refresh, and Reset data in a collection regardless of its source. DataCollections also provide constraints and transformations as well as provide status and transfer progress information.

Set and Get write and read data, respectively, from an item of data in a collection. They do not actually modify or access the source of the data. The items in a collection are double buffered. One buffer interfaces to the user of the collection and the other interfaces to the source of the data. The Set and Get functions modify the user buffer.

The Apply, Refresh, and Reset functions modify both buffers in an item. Apply writes data from the user buffer to the source buffer and then out to the data source. Refresh reads data from the source and modifies both the source buffer and the user buffer. The Reset function can be used to abort all changes by updating the user buffer with the source buffer.

This buffering scheme allows data to be transferred between the form and the data source in blocks instead of whenever each individual item is changed. Transferring data in blocks usually (it depends on the type of data source) improves performance by reducing overhead. This scheme also allows modification of items with interdependencies. As an example, item A may only be changed to a value of X if item B has a value of Y. Lastly, this scheme allows the user to abort a set of changes without actually transferring data to the source (Reset function).

The DataCollection contains one or many DataGroups and each DataGroup contains one or more DataItems. After a Refresh, Apply, or Reset an exchange of data is required between the items in the collection and the widgets interfacing to them. During the exchange, the DataItem for each widget is looked up in the DataCollection and the appropriate read/write function is executed. A read gets data from the DataItem and places it in the widget and a write sets data from the widget into the DataItem.

The DataItems maintain all the necessary information for each particular piece of data. DataItems maintain type information (Text String, MAC address, IP address, Octet String, Integer), whether the values have enumerations and what these enumerations are, whether the value is read-only, etc. DataItems also contain any constraints or transformations specified in the FDL file.

Each DataGroup is associated with a particular DataLocation and performs block transfers of its contained items to/from that location. A DataLocation is the information necessary to identify a particular data source. For an SNMP group, the location information would consist of the IP address, community string, and MIB index information for an SNMP agent. When the collection is constructed from the FDL file, the items are grouped together based on their locations.

A Constraint rule is any set of properties or restrictions that control the value of an item of data. Constraints are used by the designer of a form to enforce limitations on the values of items in a form. An error string is specified with each constraint and this string is displayed when a constraint detects an invalid value.

There are two kinds of constraints, implicit and explicit. Explicit constraints are specified as part of the grammar in the FDL file. The grammar supports various mathematical relationships such as addition, subtraction, division, equals, less than, greater than, etc. It also supports Max and Min functions and string comparisons. An example of an explicit constraint would be specifying the value of a port index item to have values between 1 and the maximum number of ports on a module.

Implicit constraints are part of the basic DataItem types (Text String, MAC address, IP address, Octet String, Integer). Each DataItem type has built in rules for its type. For example a value of 1000 would be rejected for an item of type MAC address.

Transformations or scaling functions are used to change the displayed value of a data retrieved from a DataItem. These functions can be used to add offsets, divide by constants, perform string substitutions, etc. Sometimes the source of the data does not provide it in a user friendly form. Transformations are used to correct this condition. An example of this is the MIB variable sysUpTime. SysUpTime is reported in units of time-ticks. By dividing the value by the number of time-ticks in a minute, the value can be displayed in minutes instead.

Events and Actions are used to perform operations on the items in the form when specified conditions occur. Typical events are pressing buttons or selecting/entering specific values in different fields. Typical actions are disabling/enabling fields, changing field values, and displaying messages. Actions can also be used to launch other applications or forms.

An example of a typical use would be setting a focus change event on an item with a value of enable and disable. When the user changes the value to disable, the event will trigger an action which will disable a button on the form and the reverse when the value is enable.

Another example of a typical use would be displaying a message box to confirm a change after displaying a suitable warning.

While specific embodiments of the invention have been shown and described in detail to illustrate the application of the principles of the invention, it will be understood that the invention may be embodied otherwise without departing from such principles.

What is claimed is:

1. An arrangement for operating a plurality of dynamic configuration forms, the arrangement comprising:

a form description language (FDL) file for the plurality of dynamic configuration forms, said FDL file including a description of a layout type to be displayed by the plurality of dynamic configuration forms, and a description of data to be displayed by the dynamic configuration forms;

a dynamic form software engine, said form engine being part of the application and receiving a request from the application to display one of the plurality of dynamic configuration forms, said form engine reading said FDL file, said form engine collecting said data described by said FDL file, said form engine dynamically creating a graphical appearance of a secondary window in the application with a layout in accordance with said layout type of said FDL file, and displaying said data of said FDL file in the secondary window in accordance with said layout type.

2. An arrangement in accordance with claim 1, further comprising:

another plurality of dynamic configuration files are provided and are described be another FDL file;

said form engine receiving a request from the application to display one of the plurality and another plurality of dynamic configuration forms, said software engine reading a respective said FDL file, said software engine collecting said data described by said respective FDL file, said software engine creating a secondary window in the application with a layout in accordance with said layout type of said respective FDL file, and displaying said data of said respective FDL file in the secondary window in accordance with said layout type.

3. An arrangement in accordance with claim 1, wherein: said form engine also receives a data location of said data of said one dynamic configuration file, said form engine collecting said data from said data location.

4. An arrangement in accordance with claim 3, wherein: said FDL file can be used with a plurality of different data locations to form said plurality of different dynamic configuration forms.

5. An arrangement in accordance with claim 3, wherein: said form engine reads input from an operator of the application and modifies said data in said data location in accordance with said input.

6. An arrangement in accordance with claim 1, wherein: a widget is provided for displaying and modifying said data on said dynamic configuration forms;

an operator of the application modifies said data on the dynamic configuration forms through said widget;

said form engine reads a modification of said data through said widget and modifies said data in said data location in accordance with said modification.

7. An arrangement in accordance with claim 6, wherein: a plurality of widget types are provided for displaying and modifying said data on said dynamic configuration forms;

said FDL file specifies which of said plurality of widget types are to be used for individual items of said data.

8. An arrangement in accordance with claim 6, wherein: a plurality of widget types are provided for displaying and modifying said data on said dynamic configuration forms;

said form engine specifies which of said plurality of widget types are to be used for specific types of said data.

9. An arrangement in accordance with claim 6, wherein:

a plurality of said widgets are provided for displaying and modifying individual items of said data on said dynamic configuration forms;

said FDL file specifies a size of said dynamic configuration form, a size of said widgets, and an order and alignment of said widgets.

10. An arrangement in accordance with claim 1, wherein:

the application monitors a plurality of devices, said data are operating parameters of said devices, and said data is collected from said plurality of devices;

said form engine reads input from an operator of the application and modifies said data in said devices in accordance with said input.

11. An arrangement in accordance with claim 10, wherein:

said devices store said data using different conventions;

said form engine includes a separate means for collecting said data for each of said conventions.

12. An arrangement in accordance with claim 10, wherein:

said devices operate independently based on respective said operating parameters.

13. An arrangement in accordance with claim 1, wherein:

said FDL file includes rule descriptions for controlling a value of said data.

14. An arrangement in accordance with claim 13, wherein:

said rule descriptions limit values of individual items of said data.

15. An arrangement in accordance with claim 13, wherein:

said data includes a plurality of individual data items;

said rule description varies one of said data items based on a value of another said data item.

16. The method in accordance with claim 1, wherein:

said form engine dynamically creating said graphical appearance includes choosing individual components, sizing said individual components, positioning and grouping said individual components, and associating said individual components with a data source.

17. A method for operating a plurality of dynamic configuration forms as secondary windows in an application, the method comprising the steps of:

providing a form description language (FDL) file for the plurality of dynamic configuration forms, said FDL file including a description of data to be displayed by said dynamic configuration forms;

providing a dynamic form software engine, said form engine being part of the application;

sending a request from the application to said form engine requesting display of one of the dynamic configuration forms;

said form engine reading said FDL file;

said form engine collecting said data described by said FDL file;

said form engine dynamically creating a graphical appearance of a secondary window in the application with a standard layout;

said form engine displaying said data of said FDL file in the secondary window in accordance with said standard layout.

18. A method in accordance with claim 17, wherein:

said form engine reads input from an operator of the application and modifies the data in accordance with the input.

19. A method in accordance with claim 17, wherein:

a plurality of widget types are provided for displaying and modifying the data;

an operator of the application modifies the data in the dynamic configuration form through said widget.

20. The method in accordance with claim 17, further comprising:

providing another plurality of dynamic configuration forms;

providing another form description language file for said another plurality of dynamic configuration forms;

said form engine reading a respective said FDL file for said requested one of the dynamic configuration forms when said request is received from the application.

21. The method in accordance with claim 17, wherein:

said sending of said request includes a form type and data location, each said form type corresponding to a plurality of said data locations;

said form engine collecting said data from said data location in said request.

22. The method in accordance with claim 17, wherein:

each of said dynamic configuration forms in said plurality of dynamic configuration forms groups represents a different network device.

23. The method in accordance with claim 17, wherein:

each of said plurality and said another plurality of said dynamic configuration forms represents a different aspect of a plurality of network devices.

24. The method in accordance with claim 17, wherein:

said dynamic creating of said graphical appearance includes choosing individual components, sizing said individual components, positioning and grouping said individual components, and associating said individual components with a data source.

* * * * *